Oct. 15, 1963  R. C. HOFFMAN  3,107,051
INDICATOR FOR SALES REGISTERING AND RECORDING DEVICES
Filed Jan. 13, 1961  8 Sheets-Sheet 6

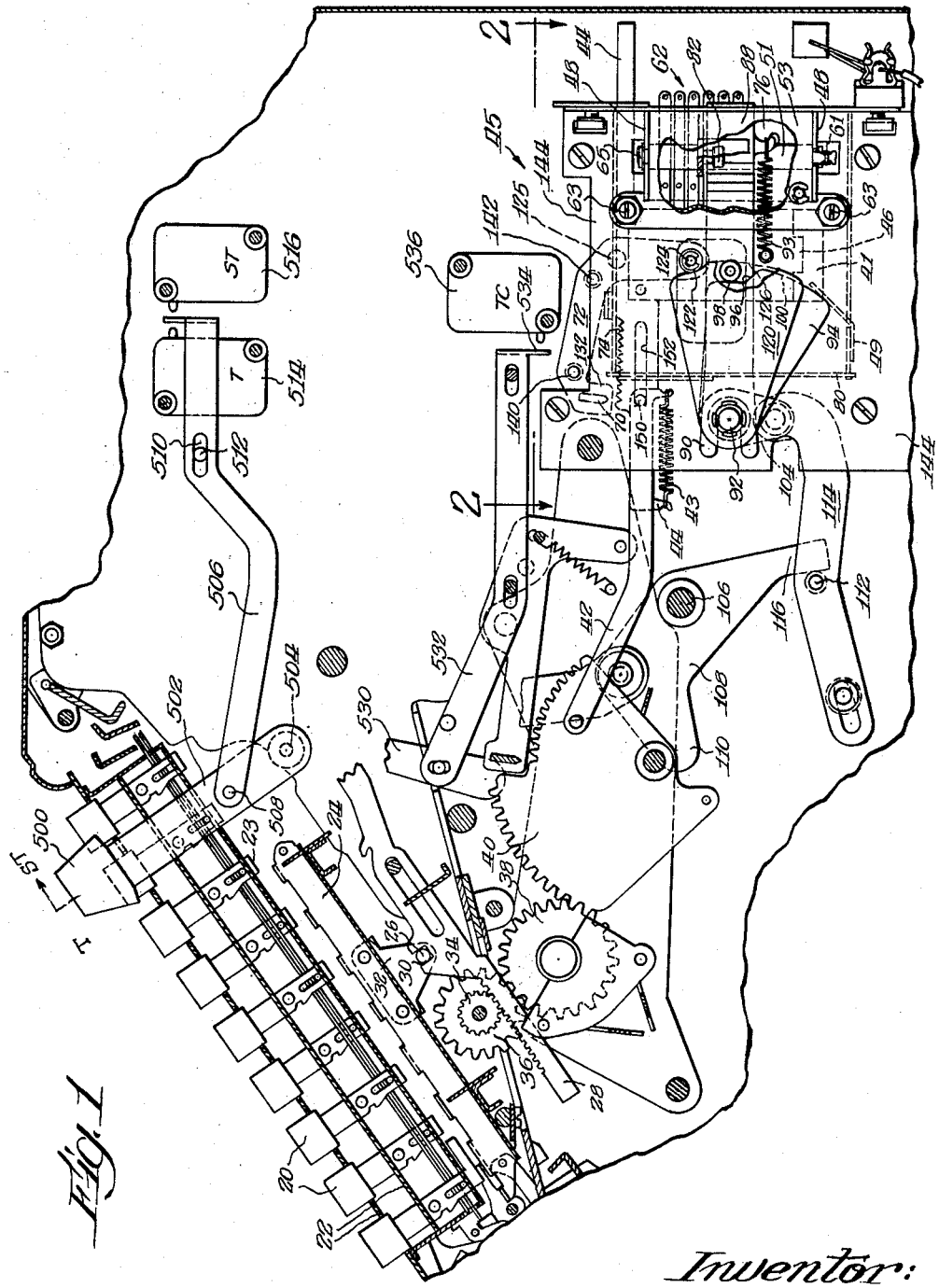

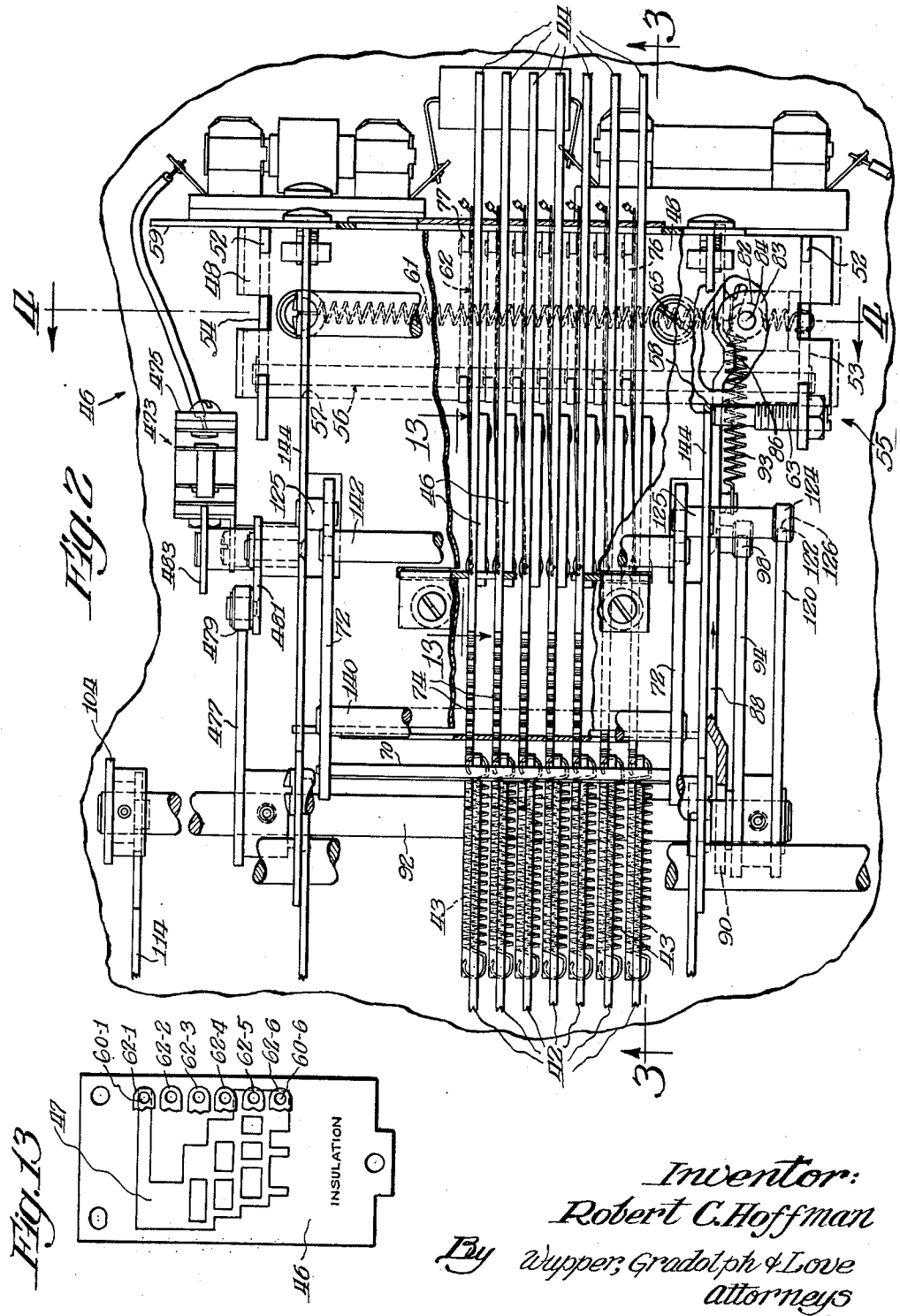

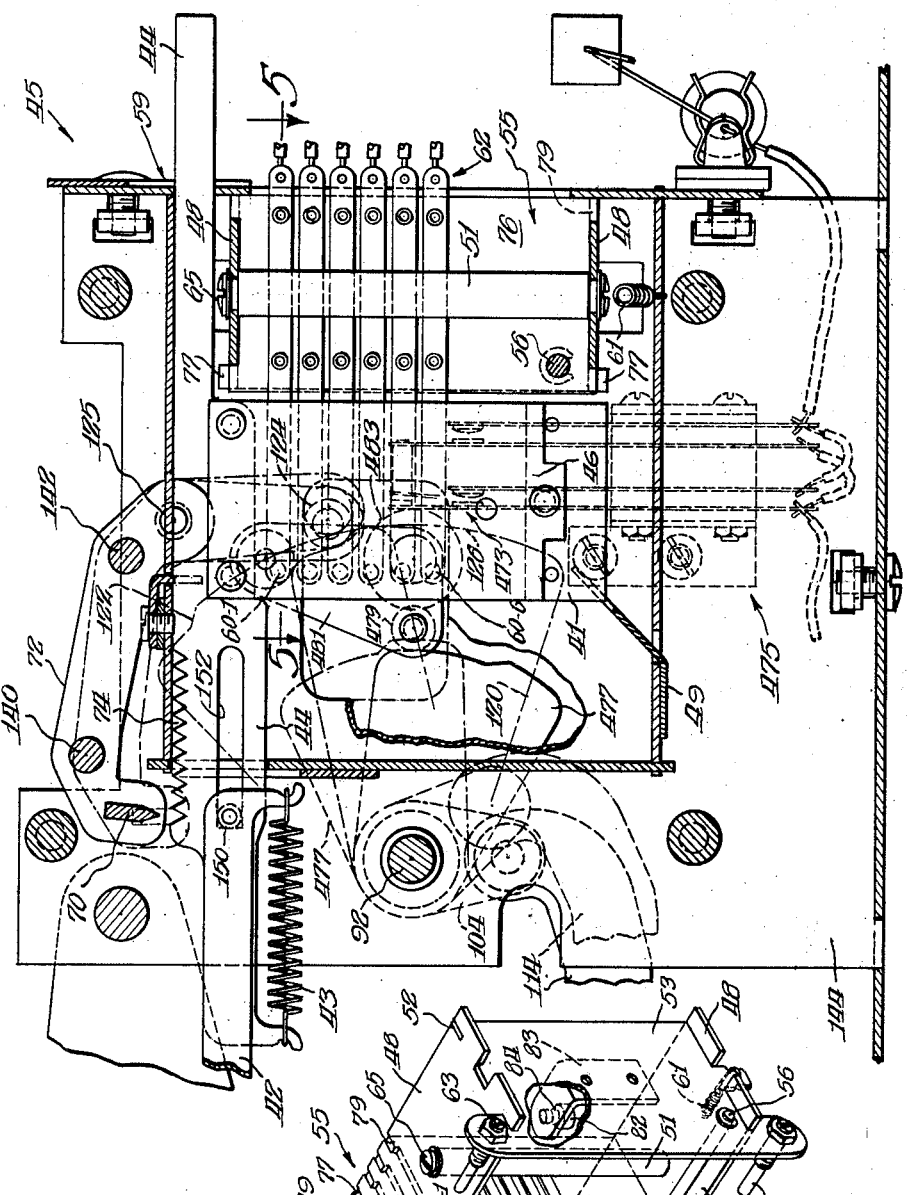

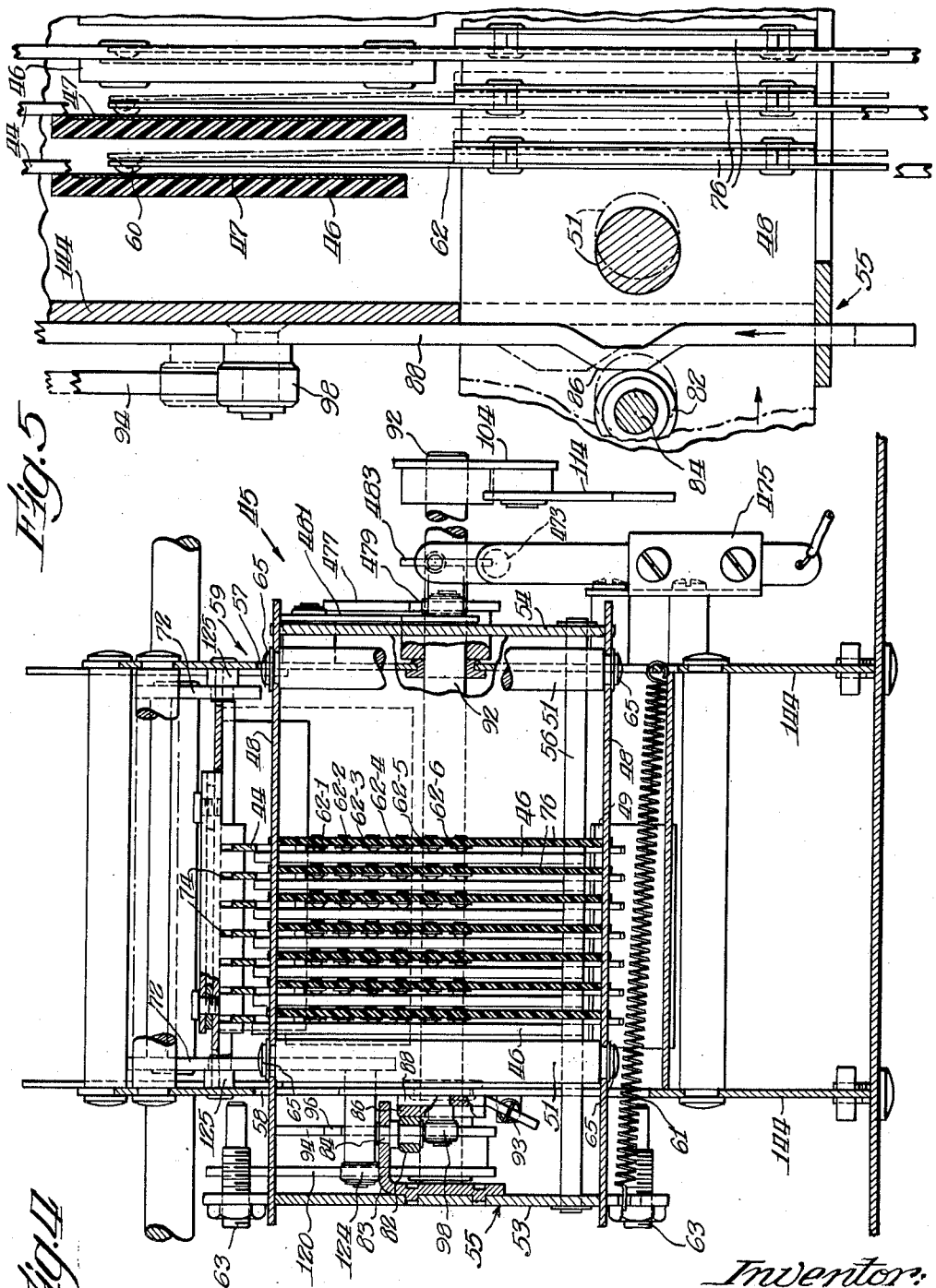

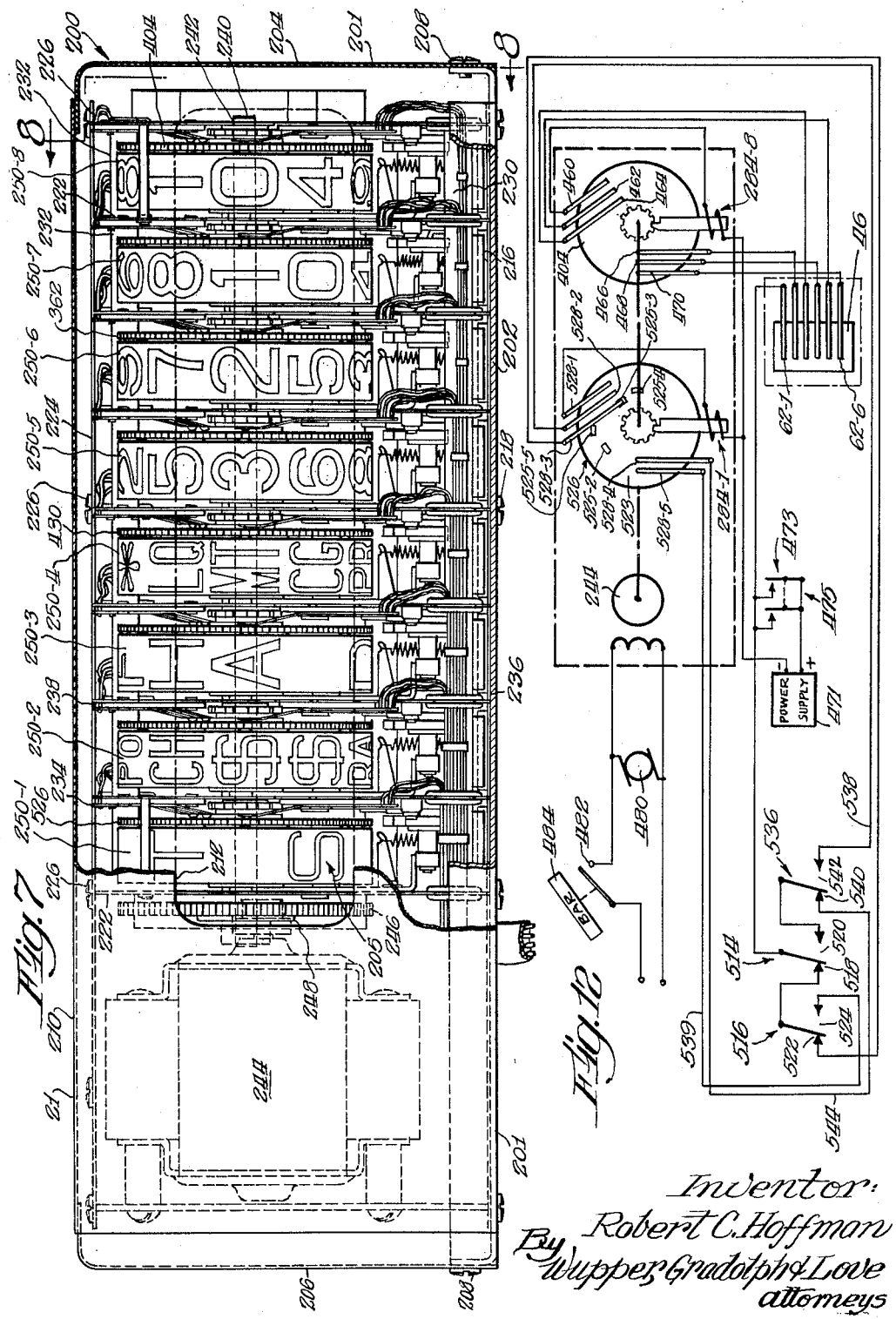

Inventor:
Robert C. Hoffman
By Wupper, Gradolph & Love
Attorneys

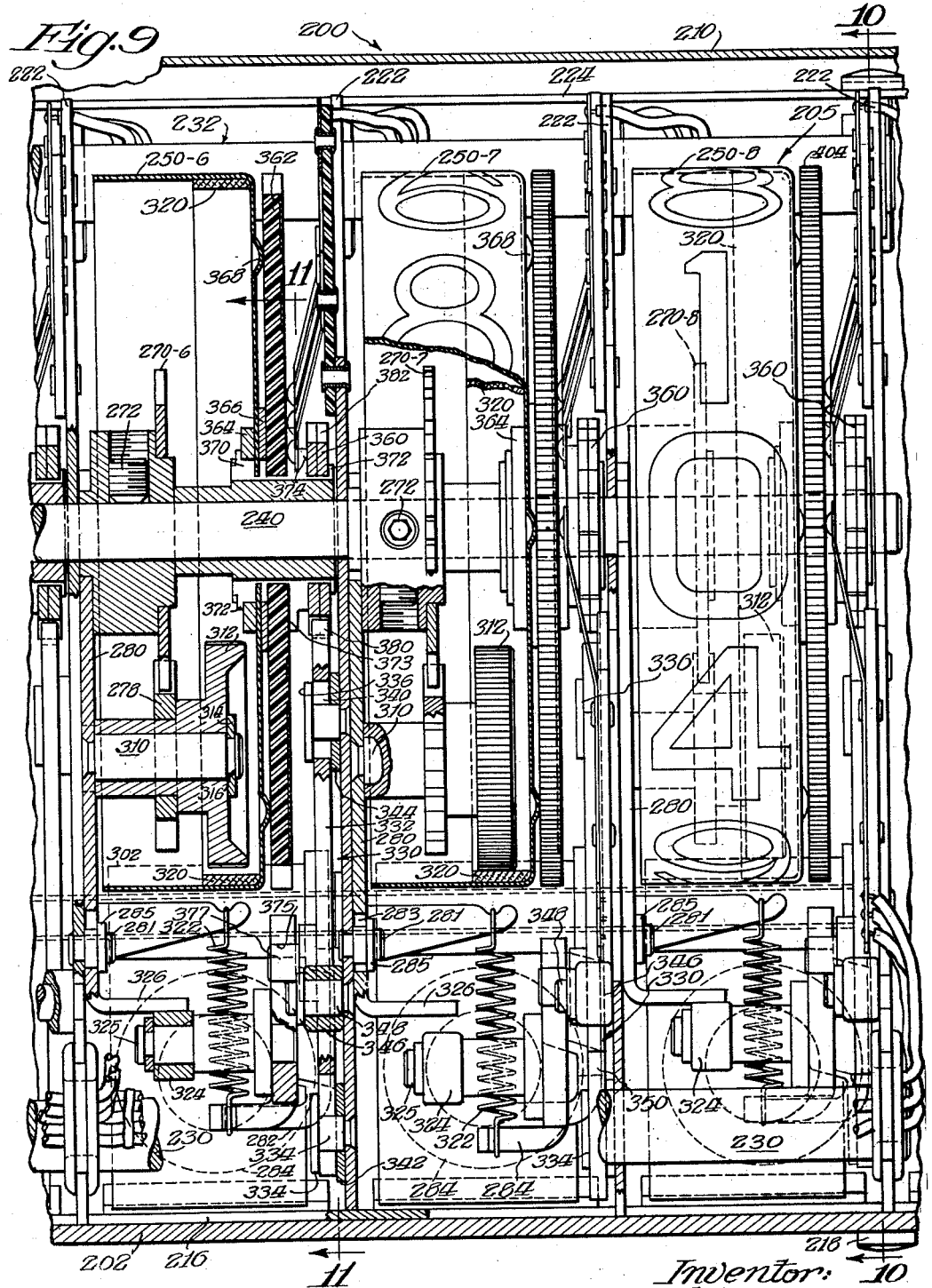

Oct. 15, 1963    R. C. HOFFMAN    3,107,051
INDICATOR FOR SALES REGISTERING AND RECORDING DEVICES
Filed Jan. 13, 1961    8 Sheets-Sheet 8
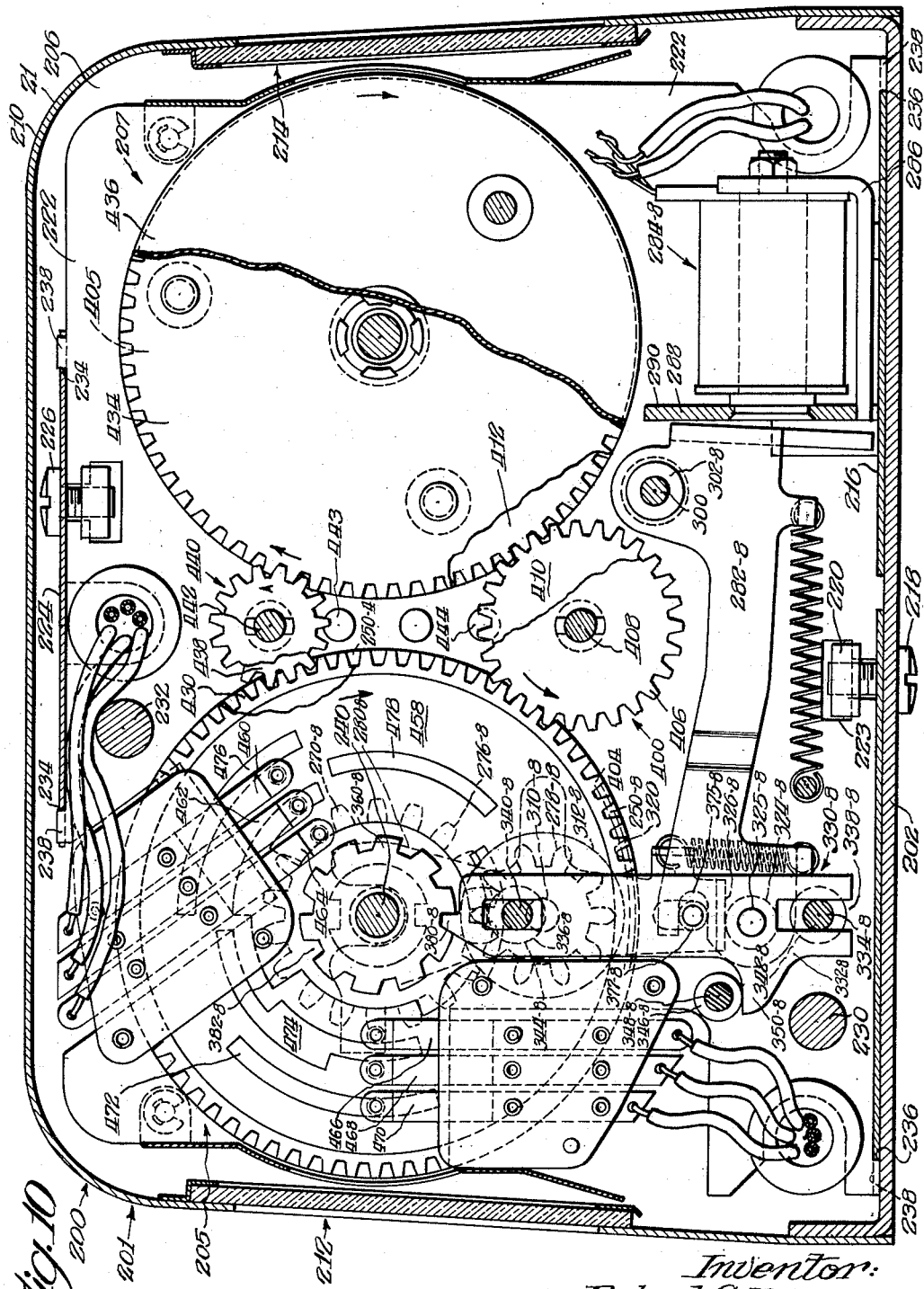
Inventor:
Robert C. Hoffman
By Wupper, Gradolph & Love
attorneys.

3,107,051
INDICATOR FOR SALES REGISTERING AND
RECORDING DEVICES
Robert C. Hoffman, Park Ridge, Ill., assignor to Victor Adding Machine Co., Chicago, Ill., a corporation of Illinois
Filed Jan. 13, 1961, Ser. No. 82,575
5 Claims. (Cl. 235—23)

This invention relates to sales registering and recording devices of the type more commonly referred to as cash registers.

Although referred to as cash registers, it will be appreciated that in recent years these machines have been redesigned and reoriented to handle various commercial transactions, such as the extension of credit to customers, and the words "cash register" are not to be interpreted in any narrow sense as indicating that only cash transactions may be registered and recorded thereby, or that the cash register is a unitary device, all parts of which are mechanically supported and housed in one location.

In the cash register art, certain operational aspects, such as the visual indication of the amounts of the various transactions being registered and recorded, to a great extent have been devoid of flexibility. In many instances, for example in the retail stores, it is desirable that the visual indications be provided in more than one direction for ease of observation by both the clerk and the customer. In addition, there are many occasions in which it is desirable to have similar, if not the only, indication at positions substantially remote from the cash register. At the same time the normal operation of the cash register must not be interfered with by reason of the provision of remote indication. It is to these features, i.e., flexibility, more than one visual indication, and remote visual indication that the present invention is primarily directed.

Accordingly, it is a primary object of the present invention to provide a new and improved visual indicator for a cash register.

It is another object of the present invention to provide an unusually flexible visual indicating means for use with a cash register.

It is another object to provide in a cash register an improved visual indicating means which can be mounted locally on the cash register and/or remotely.

It is another object to provide an improved visual indicator for a cash register which is connected to the cash register proper by electrical means.

Another object of the present invention is to provide a new and novel electrical control means for a visual indicator in a cash register.

It is another object to provide a set of drums or wheels bearing transaction and amount information and controlled by a cash register which may be located in a position remote from the drums.

It is another object to provide an improved drive means for the indicators.

It is another object of the present invention to provide an improved indicating means which is visually observable from opposite sides of a cabinet located on the cash register itself and/or at a remote location.

Other objects and the many features of the present invention will be apparent from a perusal of the following description taken in conjunction with the accompanying drawings, in which FIG. 1 is a longitudinal sectional view of the machine, partially broken away, taken substantially at the middle of the machine;

FIG. 2 is a fragmentary plan view of the readout device partially broken away substantially along line 2—2 of FIG. 1;

FIGS. 3 and 4 are fragmentary elevational views of the readout device, substantially along the lines 3—3 and 4—4 of FIG. 2;

FIG. 5 is a fragmentary horizontal sectional view of the readout device, substantially along the line 5—5 of FIG. 3;

FIG. 6 is a perspective view of the readout unit;

FIG. 7 is a front elevational view of the indicator with the case partially cut away;

FIG. 9 is an enlarged fragmentary medial sectional view of the indicator, substantially along line 9—9 of FIG. 8;

FIG. 10 is an elevational sectional view, substantially along line 10—10 of FIG. 9, showing the commutator, the contact fingers, and a portion of the transfer gearing for moving the rear indicator;

FIG. 12 is a schematic diagram of the circuit for the indicator; and

FIG. 13 is a fragmentary elevational view of a code plate and cooperating contact arms, substantially along line 13—13 of FIG. 2.

Figure 8:
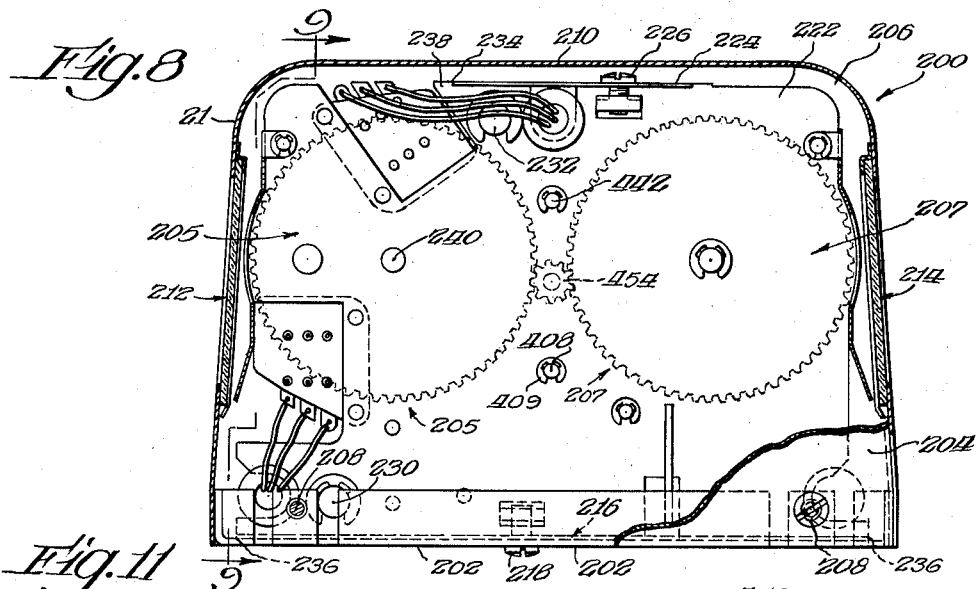
FIG. 8 is an elevational view of the right-hand end of the indicator, with the case removed substantially along the line 8—8 of FIG. 7.

The cash register of the preferred embodiment includes provision for the amounts of the various transactions, appropriate sets of depressible numeral keys, and corresponding visual indicating means being provided. By way of example, appropriate sets of keys and corresponding visual indicating means are provided for various types of operations such as credit balance, subtotals, totals, and the like; for certain functions such as cash sales, charge sales, amounts received on account, tax, amount paid out, account forward, amount tendered, and the like; for identifying the clerks from whom various items to be registered have been received; and for identifying the departments from which items are received, such as groceries, produce, meat, and the like.

The cash register includes an item accumulator which is the working accumulator for the total of a given sale or given transaction. The cash register also includes distribution accumulators designated cash, charge, tax, and received on account. Each of these accumulators has its respective key.

The invention is illustrated herein as applied to a machine of the type shown in United States Patent No. 2,550,581, issued April 24, 1950, to Thomas O. Mehan, suitably modified to be conveniently operated as a cash register; and said patent is hereby incorporated herein by reference as if it were set forth in its entirety. In general, the machine comprises the usual rows of depressible numeral and transaction keys 20 (FIG. 1), a readout device 45 producing coded electrical signals corresponding to the transaction information being registered in the machine, and an indicator 200 (FIG. 7) operated by the signals to provide a visual indication of the character and amount of each transaction.

The keys 20 are mounted in the usual key support plates 22, the lower ends 23 of the stems of these keys acting as stops to limit the movement of a vernier type actuator 24 which is coupled by a pin 26 to a rack bar 28. By having the pin rest in a slot 30 of the rack bar, the bracket 32 on the actuator is offset so that the rack bars may be placed more compactly than the actuators 24. A rack bar and an actuator are provided for each row of keys.

The rack bar 28 meshes with the teeth of a pinion 34, the latter being fixed to the second or idler pinion 36 by which the movement is amplified. The pinion 36 meshes with a pinion 38 which in turn meshes with teeth of a gear sector 40. As will be more clearly described later, there is provided a gear train similar to that from the rack 28 to the gear sector 40 for each row of keys provided for the four denominational orders of the machine and for three designating columns used in identifying the character of the transaction being recorded or registered.

From the foregoing, it will appear that as the machine is operated, the gear segments 40 will be differentially positioned in accordance with the particular keys which have been depressed.

A link 42 is pivotally connected to the gear segment 40 and, at its rearward end, is yieldably connected to a link extension or code plate arm 44 by means of a pin or stud 150 on the link, a slot 152 in the arm, and a spring 43. The rearward end of the arm 44 is connected to a code plate 46, the function of which is shown more fully in the copending application of V. S. Johnston, Serial No. 698,447, filed November 25, 1957. A code plate 46 and an arm 44 are provided for each row of keys.

The code plates 46 form one portion of a readout device 45. The code plates 46 are formed of an insulating material and are mounted in vertical planes by the code plate arms for reciprocable forward and rear movement. An electrical conducting surface 47 having a predetermined pattern (FIG. 13) is affixed to one side of each of the code plates 46. Each of the patterns in the preferred embodiment is the same, although it will be appreciated that different patterns may be used. Each code plate 46 carries a guide plate 41 at its lower end, and a guide bracket 49 includes slots in which the plates 41 are received for guiding the code plates 46 in their reciprocable paths.

Vertical banks of contactors 60 carried on contact arms 62 are arranged to cooperate with the patterns 47 to "read" the position of the pattern. Each vertical bank of contactors and its corresponding pattern are arranged such that in each of the positions available to the code plate the pattern will establish an electrical circuit between one of the contactors and predetermined two other contactors, depending upon the position of the code plate and its associated pattern which is apertured.

Thus, as shown in FIG. 13, the code plate 46 is adapted for engagement with a vertical bank of contactors 60—1 to 60—6 on contact arms 62—1 to 62—6. It will be recalled that the gear segment 40 when actuated by one of the keys 20 will position the associated code plate 46 in one of ten available positions corresponding to the actuated key. The movement of the code plate by the gear segment is toward the right with respect to FIG. 13. In each of these ten positions available to the code plate 46, the contactor 60—1 will be in a position in which it may be engaged with the conducting pattern 47. However, as the code plate is moved selectively by the segment 40 from left to right (FIG. 13) consecutively to succeeding positions available to the plate, the contactors 60—2 to 60—6 will be positioned for engagement with the conducting surface in the following order: 60—5 and 60—6, 60—4 and 60—6, 60—4 and 60—5, 60—3 and 60—6, 60—3 and 60—5, 60—3 and 60—4, 60—2 and 60—6, 60—2 and 60—5, 60—2 and 60—4, 60—2 and 60—3. Thus the contactor 60—1 may be selectively connected to a predetermined pair of contactors 60—2 to 60—6 depending upon the position of the pattern 47.

As best seen in FIG. 6, each vertical bank of contact arms 62 is secured to a corresponding mounting block 76 of insulating material. Projections 77 are formed at either end of the tops and bottoms of the mounting blocks 76 and these projections are received in corresponding slots 79 in a pair of upper and lower mounting plates 48. The plates 48 are suitably secured by means of spacers 51, screws 65, and cooperating slots 52 to a pair of side walls 53 and 54. The contact arm mounting blocks 76, the upper and lower plates 48, and the side walls 53 and 54 form a unitary rigid assembly 55. An aligner bar 56 is received through apertures in the mounting blocks and is suitably secured to the side walls 53 and 54 of the contact arm assembly 55 more accurately to position the mounting blocks and the contact arms carried thereby.

The contact arm assembly 55 is received through and slidably supported in openings 57 and 58 in the sides of a readout unit frame 59 for reciprocable movement in a horizontal plane, as best seen in FIGS. 3 and 4. A spring 61 secured at one end to the frame and at the other end to a projection on the lower plate 48 normally urges the assembly 55 toward the right with respect to FIG. 4. Limit screws 63 limit the travel of the assembly 55 when urged toward the right by the spring 61. In this position to which the assembly 55 is urged by the spring 61, the contactors of the contact arm bank 62 do not engage the conducting surfaces of the corresponding conducting patterns of the code plates 46 as seen in FIG. 2.

Engagement of the contactors of the contact arm bank 62 with the conducting surfaces on the code plates is made by means of a slide 88 having a cam surface 86 and a roller 82 rotatably mounted on a shaft 84. Engagement of the contactors with their conducting surfaces is simultaneous, and as will be described later, is made only after the code plates have been selectively positioned by their respective gear segments 40, and an aligner bar 70 carried by a pair of arms 72 is pivoted into locking engagement with the teeth of a rack-like portion 74 formed on the upper edges of the code plate arms 44. The roller 82 is carried by a bracket 83 which is suitably secured to the side wall 53 of the contact arm assembly 55. Thus, the roller 82 is mounted for reciprocable movement with the assembly 55.

The cam surface 86 is carried on the slide 88 which has a fork-like end 90 received around and carried by a shaft 92 for reciprocable movement of the slide along an adjacent side plate 144 of the readout frame 59. A spring 93 suitably secured at one end to the frame 59 and at its other end to the slide, urges the slide forwardly to the position shown in FIG. 1.

A cam plate 94, secured to the shaft 92 for rotation therewith, includes a cam surface 96 (FIG. 1) which is engageable with a roller 98 secured to the slide 88 to cause the roller 98 to ride up over the rise 100 of the plate 94, urging the slide 88 rearwardly. When the slide arm 88 is urged rearwardly, the cam surface 86 moves the roller 82 and the contact arm assembly 55 to the right as best seen in FIG. 5, and in this position the contactors 60 of the contact arm bank 62 engage the code plates 46.

The shaft 92 is rotatably carried by the side walls of the frame 59 and is oscillated by an arm 104 (FIG. 1) at the end of the forward stroke of a main shaft 106 by means of a drive crank 108 which has a projection 110 which engages a roller 112 carried by a drive link 114 pivotally secured to the pivot arm 104 and suitably guided for longitudinal movement. The projection 110 on the drive crank 108 begins its movement at the beginning of the forward stroke and engages the roller 112 a short time interval before the end of the forward stroke to move the drive link a short distance by the time it reaches the end of the forward stroke. The drive link in turn rotates the pivot arm 104 to rotate the shaft 92.

The drive link, the pivot arm, and the shaft remain in the pivoted position until shortly before the end of the return stroke. The drive crank 108 includes a second projection 116 which is angularly displaced approximately 90° from the projection 110. The projection 116 engages the roller 12 a short time interval before the end of the return stroke to return the drive link 114, the pivot arm 104, and the shaft 92 to their home positions.

During the interval that the shaft 92 is in its actuated position, the contact arm assembly will maintain the selected contactors in engagement with the conducting patterns of the code plates. This will provide engagement of the contacts with the conducting surfaces of the code plates for a sufficient time, as will hereinafter appear, for the indicator wheels to be actuated to positions corresponding to the codes set up by the contact arms and the code plates. This time interval during which the contact arms prepare a circuit through the code plates is sufficient for permitting a complete revolution of the indicator wheels for seeking the proper position for each of the wheels.

The shaft 92 carries a second cam plate 120 with a camming surface 122. When the shaft 92 is rotated counterclockwise, as described above, the camming surface 122 actuates a roller 124, the roller riding up over the rise 126 on the camming surface. The roller is carried at one end of one of the arms 72, which arms are connected by tie rods 140 and 142 and are pivoted on pins 125 carried by the side plates 144 of the readout frame 59 to pivotally support the aligner 70. When the roller 124 moves up over the rise 126 on the cam surface, it rotates the arms 72 in a counterclockwise direction (FIG. 1) about the pins 125 to urge the aligner 70 into latching engagement with the notches in the rack portions 74 of the code plate arms 44 to maintain the arms 44 and code plates 46 in their actuated positions.

As described above, the shaft 92 remains in its actuated position until slightly prior to the end of the return stroke, and therefore the arm 44 and the code plate 46 will remain in their actuated positions until slightly prior to the end of the return stroke.

The roller 98 rides down the cam surface 96 a short time interval before the roller 124 rides down the cam surface 122 to permit the cam plate 94 to return the contact arm assembly 55 to its restored position with the contact arms out of engagement with the code plates prior to the cam plate 120 permitting the aligner 70 to disengage itself from the teeth of the rack portion 74. The spring 43 interconnecting the link 42 and the link extension or code plate arm 44 returns the code plate to its normal position when the aligner 70 disengages itself from the teeth of the rack portion 74. The link 42 will have returned to its normal position. Each of the links 42 carries a stud 150 which is reciprocably received within an elongated slot 152 in the corresponding link extension or code plate arm 44. Actuation of a selected one of the keys 20 moves the link 42 and the arm 44 to the left. As the actuators are restored during the return stroke, the links 42 are correspondingly returned to their normal or home positions, such travel being possible even though the aligner bar 70 is still engaged with notches in the link extension 44. When the aligner bar 70 is disengaged, the spring 43 draws the link extension 44 rearwardly until such movement is arrested by engagement of the stud 150 with the forward end of the elongated slot 152.

As may be inferred from the description of the code plate and associated parts previously mentioned, the purpose is to detect or read the positions of the actuators as controlled by the keys 20. The positions of the code plates are read to enable the setting of the amount indicator drums for displaying the amount being entered into the registers. In a similar manner, the character of the transaction, the clerk initial or number, and the like, are displayed by setting indicator drums in accordance with the detected positions of the code plates provided for this information. These indications are often preferably read from the back of the machine (and/or remotely) as well as from the front of the machine, for the cash register is particularly designed for retail transactions in which both the customer and a checker or supervisor are interested in seeing the amounts being entered by the clerk.

The indicator 200 may be suitably secured to the upper part of the cash register on side frames (not shown). Alternatively, the indicator may be positioned at any remote location which is desired.

The indicator 200 includes a generally rectangular housing 21 (FIGS. 8 and 10) having a base plate 202, a pair of side plates 204 and 206 (FIG. 7) suitably secured to the base plate by means of screws 208, and a generally U-shaped cover 210 secured to the side plates 204 by welding and having front and rear windows 212 and 214.

Figure 11:
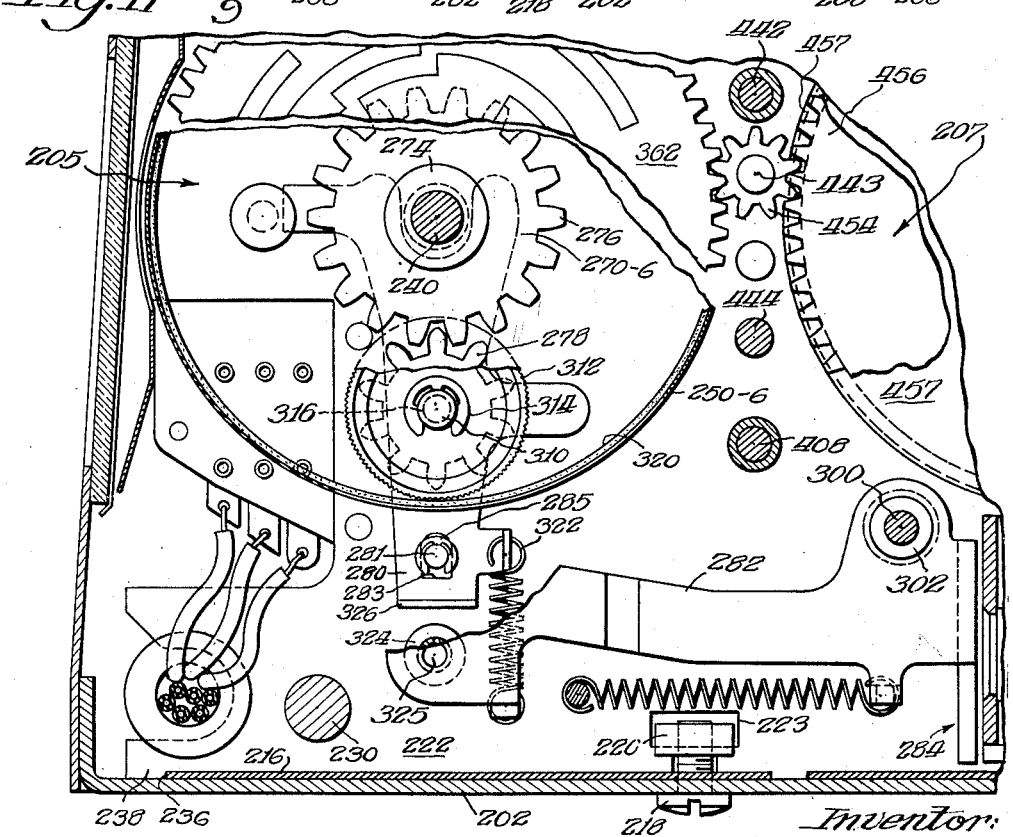
FIG. 11 is a fragmentary sectional view substantially along line 11—11 of FIG. 9, showing the drive means for one of the indicator wheels or drums.

The housing receives front and rear indicator assemblies 205 and 207 carried by a base 216, vertical frame plates 222, and a top plate 224. The base 216 and three of the frame plates 222 are secured to housing base plate 202 by means of screws 218 and frame nuts 220 (FIG. 11). The frame nuts are slotted diametrically on their lower surfaces and are received in and secured to T-slots 223 in the frame plates 222. The top plate 224 is secured to the upper ends of the frame plates 222 by means of similar screw and frame nut fastening assemblies 226.

A pair of aligning rods 230 and 232 (FIGS. 7 and 10) are received through apertures in each of the frame plates 222 to maintain the various rotating parts of the indicator assemblies 205 and 207 in alignment with each other. The top and base plates 224 and 216 are notched on opposite sides as shown at 234 and 236 (FIG. 10) to receive and position lugs 238 in each of the frame plates.

A drive shaft 240, received through apertures 242 in the frame plates, is suitably secured to a drive motor 244 by means of a bull gear 246 secured to the shaft and a drive pinion 248 secured to the output shaft of the motor. The front indicator assembly 205 includes a plurality of indicator wheels or drums 250—1 to 250—8, rotatably carried by the drive shaft and driven by the shaft by means of suitable electric clutch mechanism which will be described in detail below.

The drive shaft carries a plurality of drive gears 270—1 to 270—8 for the drums 250—1 to 250—8, which gears are suitably secured to the shaft by means of screws 272 inserted through hub portions of the gears. Since each of the drive gears and its associated clutch mechanism are similar to the others, only gear 270—6 and its clutch mechanism will be described in detail. For a better understanding, reference to FIG. 10 may be had for parts described with respect to FIGS. 9 and 11, similar parts in FIG. 10 bearing the same number with the suffix "—8" added thereto.

The drive 270—6 includes a plurality of peripheral teeth 276 which mesh with teeth in a pinion gear 278 which is carried by a slide 280 which in turn is connected to the armature 282 of a magnet 284. The slide is guided by a stud 281 received through slot 283 and by the hub portion of the drive gear 270—6 received in its bifurcated upper end. Keeper 285 secured to the stud and the drive gear retains the slide against the adjacent frame plate.

The magnet is carried by an L-shaped frame 286, one magnet being provided for each of the indicator drums. The individual frames 286 provided for each of the magnets are suitably secured to a plate 288 which is received in slots 290 in each of the frame plates 222. The frame 286 is locked against sidewise movement by engagement with the frame plates. The armature 282 is rotatably carried by a shaft 300 which is received through apertures in each of the frame plates. The armature 282 includes an elongated transverse cylindrical bearing surface 302 which is reduced in diameter adjacent the frame plates to prevent excessive friction.

The slide 280 carries a horizontal pin or shaft 310 which rotatably supports the pinion 278 and a knurled drive disc 312. The pinion and drive disc are retained on the shaft 310 by means of a keeper 314 inserted in a slot 316. The drive disc in the deenergized position of the magnet is in its uppermost position out of engagement with a friction strip 320 bonded to the inner periphery of the indicator drum 250—6. In the deenergized condition of the magnet there is a spacing preferably in the order of .020" between the drive disc 312 and the friction strip 320. When the magnet is energized, the armature 282 is pulled downwardly moving the slide 280 with it, the slide in turn lowering the drive disc into engagement with the friction strip. In this lowermost position of the slide, the pinion 278 is still engaged with the drive gear 270—6. However, the teeth of the pinion and gear are not in close meshing relationship and there is some backlash.

The connection betwen the slide 280 and the magnet armature 282 is made by means of a helical tension spring 322 and by means of a roller 324 which is carried on a stud 325 at the outer end of the armature. In the uppermost position of the armature, the spring urges a lug 326 formed at the bottom of the slide into engagement with the roller as shown in FIG. 9. When the armature 282 is urged to its lowermost position by the energized magnet, the drive disc engages the friction strip and continued movement of the armature causes the roller 324 to be disengaged from the slide lug 326 and the tension spring 322 to urge the slide downwardly to provide good frictional engagement between the drive disc and the friction strip.

A detent assembly 330 is positioned on the other side of the armature 282. The assembly 330 includes a detent 332 having slots 338 and 340 which receive headed studs 334 and 336 carried by the adjacent intermediate frame plate to guide the detent for reciprocable movement in a vertical plane. A pair of spacers 342 and 344 are carried by the studs between the detent and the frame plate. A roller 346, mounted on the adjacent frame plate by means of a pin 348 riveted to the plate, cooperates with a projection 350 on the detent to act as an upper limit for the detent.

A ten position notched indexing wheel 360, the indicator drum 250—6, and a fiber gear 362 are keyed to a common hub 370. A spacer 366 is interposed between the drum and the fiber gear, and the drum is notched at 368 in a plurality of circumferentially spaced positions for maintaining the spacing between the drum and the fiber gear. A backup washer 364 is positioned on the side of the drum opposite the spacer 366; and the hub is staked at 372 to secure the washer 364, the drum, the spacer 366, and the fiber gear securely in place against a shoulder 373. The opposite end of the hub is staked at 372 to maintain the indexing wheel securely against a shoulder 374.

In the deenergized position of the magnet, the armature is in its uppermost position. In this position the armature slot 375 engaging the pin 377 urges the detent assembly 330 to its uppermost position, in which a projection 380 engages one of the notches 382 in the indexing wheel to prevent rotation of the indicator drum. In the energized condition of the magnet the armature is urged to its lowermost position, in which the slot 375 engages the pin 377 and urges the detent downwardly out of engagement with the indexing wheel. In FIG. 9, drum 250—6 is shown in the latched condition and drum 250—7 in the driven condition.

Thus, it can be seen that when the magnet is deenergized, the drive disc 312 is out of engagement with the friction strip 320 of the indicator wheel and that the detent 332 is in locking engagement with the indexing wheel 360. In the energized condition of the magnet, the detent is disengaged from the indexing wheel and the drive disc is urged by the spring 322 into driving engagement with the friction strip of the indictor drum.

It will be recalled that two sets of indicator drum assemblies 205 and 207 are located for observation from the front and rear of the indicator housing. Since in normal procedure it is desirable to read at least certain of the information from left to right, it is necessary to reverse the position of certain of the drums in the rear assembly.

The drums in the assembly 207 appearing left to right as viewed from the rear window 214, will correspond respectively to drums 250—4, 250—5, 250—6, 250—7, 250—8, 250—3, 250—2, and 250—1. Thus, direct single pinion gear connections between corresponding front and rear drums as shown in FIG. 8 can be made for drums 250—1, 250—2, 250—3, and 250—6 only, and four crossover gear assemblies are provided for driving the rear drums corresponding to drums 250—4, 250—5, 250—7, and 250—8. FIG. 10 shows portions of these crossovers. FIG. 10 is taken generally along line 10—10 of FIG. 9 except for the small broken away sections of the crossover connections.

FIG. 10 shows the crossover assembly 400 for the front units drum 250—8 and its corresponding rear units drum 405. A fiber gear 404 associated with the front units drum 250—8 meshes with a spur gear 406 which is keyed to a crossover shaft 408. The crossover shaft 408 is rotatably received in suitable apertures in the frame plates 222 and is held in place by keepers 409 (FIG. 8). A second gear 410 is keyed to the crossover shaft 408 and meshes with a fiber gear 412 associated with the rear units drum 405. When the fiber gear 404 is rotated in a clockwise direction with respect to FIG. 10, it rotates the gear 406 in a counterclockwise direction. The crossover shaft 408 and the gear 410 rotate with the gear 406 to rotate the fiber gear 412 in a clockwise direction, the gear 412 carrying the rear units drum 405 with it.

Similarly, the fiber gear 430 associated with the drum 250—4 drives a fiber gear 434 associated with a corresponding drum 436 by means of a pair of crossover gears 438 and 440 and a crossover shaft 442. Drums 250—5 and 250—7 drive corresponding rear drums (not shown) in a similar manner by crossover gears (not shown) and crossover shafts 443 and 444.

The drums 250—1, 250—2, 250—3, and 250—6 are directly connected by means of idler pinions to corresponding drums in the rear thereof. Thus, the fiber gear 362 associated with the drum 250—6 (FIG. 9) meshes with an idler pinion 454 (FIG. 11) which meshes with a fiber gear 456 associated with the corresponding drum 457 to the rear of drum 250—6.

Each of the fiber gears associated with the indicator drums viewable from the front of the machine includes a metallic pattern on the side thereof. This metallic pattern is formed for making desired electrical connections to a respective clutch actuating magnet. Thus, the drum 250—8 (FIG. 10) includes a pattern 458. A plurality of brushes or contact arms 460, 462, 464, 466, 468, and 470 are positioned for engagement with the metallic pattern 458. Each of the contact arms 460—470 is positioned at a different distance from the axis of the fiber gear than the others. The contacts 460—470 are connected to the group of contact arms 62—1 to 62—6 in the readout device corresponding to the same denominational order. The metallic pattern 458 has a plurality of arcuate openings 472, 474, 476, and 478 backed by insulating material. The contact pattern is such that the contact arm 460 is always in conducting relation with the metallic pattern. The metallic aperture pattern is formed such that two of the remaining contacts 462—470, which as will be described below have potential applied thereto, will leave the metallic pattern and engage the insulating material in the apertures 472 to 478 when the wheel 250—8 is properly positioned.

Returning to the readout device, it will be remembered that, in the ten differing positions in which the code plate 46 may be set, the contactor 60—1 and two of the remaining five contactors 60—2 to 60—6 will be positioned for engagement with the conducting pattern 47.

The positive terminal of a power supply 471 (FIG. 12) is connected to the contact arms 62—2 to 62—6 by way of contacts 473 of a power switch 475, the contact arm 62—1, and the contact pattern 47. The contact arms 62—2 to 62—6 are connected to the contact arms 462—470. The contact arm 460 is connected to the coil of the magnet 284—8, the other terminal of the magnet coil being connected to the negative terminal of the power supply.

The contacts 473 of the switch 475 are operated by a cam plate 477 secured to shaft 92 (FIGS. 2, 3, 4), a roller 479 carried on a pivot arm 481, and a disc 483 carried by the arm. The contacts 473 are closed shortly after the contactors 60—1 to 60—6 engage the conducting patterns 47 and are opened shortly before the contactors are disengaged from the patterns.

A main drive motor 480 (FIG. 12) is energized over an obvious circuit upon closure of the contacts 482 by a manually actuated motor bar 484. Actuation of the motor bar also completes an obvious circuit for energizing the indicator drive motor 244.

A total-subtotal key 500 (FIG. 1) is provided at the upper right corner of the numeral keyboard. The key 500 includes a depending arm 502 which is pivotally supported on a stud 504. A switch actuating link 506 is pivotally connected to the stem 502 by stud 508, and the link 506 includes a slot 510 which receives a stud 512 guiding the link for reciprocal movement to actuate one of two miniature snap switches 514 and 516. The switch 514 when actuated opens contacts 518 and closes contacts 520 (FIG. 12). The switch 516 when actuated opens contacts 522 and closes contacts 524. Movement of the total-subtotal key 500 forwardly and rearwardly actuates the switches 514 and 516 respectively.

The contacts 518, 520, 522, and 524 of the total and subtotal switches 514 and 516 cooperate with a conducting pattern 523 on the fiber gear 526 of the drum 250—1 and brushes or contact arms 528—1 to 528—5 to move the drum 250—1 to a position corresponding to the position to which the total-subtotal key 500 is actuated so as to provide the proper indication T or S on the indicator drum.

The machine is equipped with an overdraft or credit balance mechanism. This mechanism may be of any well known type, such as those shown in said Mehan patent and in United States Patent No. 2,834,542, issued May 13, 1958, to Oscar J. Sundstrand, and is here illustrated as including a lever 530 which is shown in normal position in FIG. 1, and which upon the occurrence of an overdraft moves rearwardly and by virtue of link 532, suitably mounted for sliding movement on the side frame of the machine, has its sidewardly and downwardly extending lug 534 brought into engagement with an actuating part of a snap switch 536. The lever 530 is pivotally supported above its connection with the link 532 and is suitably operated from its home position for actuation of the switch 536 by the "fugitive 1" inserting means described at length in Patent Nos. 2,550,581 and 2,834,542. For example, the lever 530 may be connected directly or by suitable linkage to the bell crank 1014 of the "fugitive 1" means in Patent 2,834,542.

As will be apparent from the wiring diagram of FIG. 12, the switches 514 and 536 cooperate with the conducting pattern 523 and brushes 528—1 and 528—2 to move the drum to a credit balance of total change position identified by the symbol TC. This feature is of considerable utility in connection with cash transactions in which an amount greater than the amount of the purchase is tendered to the cashier. In such instances, the cashier will have entered the amounts of the various items purchased and the amount of the tax, and will have totaled the amounts. Upon the customer's tendering a greater amount, the cashier will enter this amount by actuating the numeral keys and an "amount tendered" key, which conditions the machine for subtraction. The motor bar is depressed and the subtraction is made in the working accumulator to cause actuation of the switch 536. Then key 500 is operated to the total taking position and the motor bar is again depressed to give visual indication of a negative total which apprises the cashier of the exact amount of change to be returned to the customer from the amount of the money tendered for the articles, and to expose the symbol TC on the drum 250—1.

The selective positioning of the drum 250—1 will now be described in more detail. The positions of the total, subtotal, and credit balance symbols T, S, and TC on the drum 250—1 are indicated in FIG. 12 in relation to the conducting pattern 523 and brushes 528—1 to 528—5. The brush 528—1 engages the pattern 523 in all positions of the gear 526 to extend negative battery potential from the power supply, through magnet 284—1 to the pattern 523, and brushes 528—2 to 528—5 engage the contact pattern except when the insulating areas 525—2 to 525—5 are rotated into positions opposite the brushes 528—2 to 528—5 respectively. In the event that the subtotal switch 516 is in its actuated condition when the switch 475 is closed, the positive terminal of the power supply will be extended to brush 528—5 by way of contacts 518 and 524 and conductor 539 and the drum 250—1 and gear 526 will be rotated until the insulating area 525—5 moves into position before the brush 528—5. In this position the symbol S is exposed through the window 212.

Similarly, if the total switch 514 has been actuated for a total taking operation, the positive power supply terminal will have been extended to brush 528—4 by contacts 520 and 540 and conductor 544 to cause rotation of the drum 250—1 and gear 526 until the brush 528—4 engages the insulating area 525—4, in which position the symbol T is visible through the window 212.

The drum 250—1 is blank diametrically opposite the symbol T, and this portion is exposed when item amounts are entered in the machine. Contacts 518 and 522, brush 528—3, and area 525—3 control the movement of the drum 250—1 to this position.

When switches 514 and 536 are in their actuated positions for a credit balance taking operation, the positive power supply terminal will be connected to the brush 528—2 by contacts 473, 520 and 542 and conductor 538 to rotate the drum 250—1 and gear 526 until the brush engages the insulating area 525—2, in which position the symbol TC is visible through the window 212.

The cash register as usual has a cash drawer (not shown) which is spring expelled and manually returned, there being a suitable mechanical connection between the total-subtotal key which will operate a trip latch (not shown) so as to permit the cash drawer to be pushed outwardly by its springs.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a sales registering device, a selectively positioned, information bearing mechanism comprising a drum bearing information at circumferentially spaced positions thereon, a shaft rotatably mounting the drum, a motor for driving the shaft, an electromagnet having an armature movable alternatively to first and second operating positions, a drive gear fixed on the shaft, a rotatable pinion supported for movement by the armature toward and away from the drive gear for tight and loose meshing engagement with the gear in the second and first armature positions respectively for continuous driving engagement of the gear with the pinion, an annular friction strip on the drum, a drive disc connected for rotation with the pinion and engageable with the friction strip to rotate the latter when the armature is moved to the first operating position, and latch means for preventing movement of the drum when the armature is in the second operating position.

2. In a sales registering device, an indicator mechanism comprising a hollow indicator drum, a shaft rotatably mounting the drum, a motor for driving the shaft, an electromagnet having an armature movable toward and away from the shaft to first and second operating positions adjacent the drum, a drive gear fixed on the shaft, a rotatable pinion supported for movement by the armature toward and away from the drive gear for tight and loose meshing engagement with the gear in the second and first armature positions respectively for continuous driving engagement of the gear with the pinion, an annular friction strip on the drum, a drive disc connected for rotation with the pinion and engageable with the friction strip to rotate the latter when the armature is moved to the first operating position, a notched indexing wheel supported for rotation with the drum, and a detent supported for movement by the armature into and out of locking engagement with the wheel to prevent movement of the wheel and drum when the armature is in the second operating position.

3. In a sales registering device, an indicator mechanism comprising an indicator drum, a shaft rotatably mounting the drum, a motor for driving the shaft, an electromagnet having an armature movable toward and away from the shaft to first and second operating positions adjacent the drum, a drive gear fixed on the shaft, a pinion, a slide rotatably supporting the pinion, means connecting the slide to the armature for movement of the pinion toward and away from the drive gear for tight and loose meshing engagement with the gear in the second and first armature positions respectively for continuous driving engagement of the gear with the pinion, an annular friction strip on the drum, a drive disc supported by the slide for rotation with the pinion and engageable with the friction strip to rotate the latter when the armature is in its first position, and latch means for preventing movement of the drum when the armature is in its second position.

4. In a sales registering device, an indicator mechanism comprising a hollow indicator drum, a shaft rotatably mounting the drum, a motor for driving the shaft, an electromagnet having an armature movable toward and away from the shaft adjacent the drum, a drive gear fixed on the shaft, a pinion, a slide rotatably mounting the pinion, means guiding the slide for reciprocable movement along a radial line extending from the shaft adjacent the drum, resilient means connecting the slide to the armature for movement of the pinion by the armature toward and away from the drive gear for tight and loose meshing engagement with the gear in the armature positions away from and toward the shaft respectively for continuous driving engagement of the gear with the pinion, an annular friction strip on the inner peripheral surface of the drum, a drive disc supported by the slide for rotation with the pinion at least partially within the drum and engageable with the friction strip to rotate the latter when the armature is moved away from the shaft, a notched indexing wheel supported for rotation with the drum, and a detent supported for movement by the armature into and out of locking engagement with the wheel to prevent movement of the wheel and drum when the armature is moved toward the shaft.

5. In a cash register having manually operable amount keys, actuators controlled by the keys and an accumulator engaged by the actuators, means for indicating in two opposite directions amounts entered into the accumulator comprising a code plate for each decimal denomination of the amounts, means selectively positioning the code plates in accordance with the actuation of the keys, contact sets sensing the position of respective plates and energized in a coded arrangement corresponding to the position sensed, a first group of rotatably mounted coaxial drums bearing numeral indications, the drums arranged in order side by side according to the denominations they represent for observation from one direction, a motor, electric clutch means for connecting the motor to the drums to rotate the latter, a group of gears having electrical conducting coded patterns and mounted for rotation with respective drums, brush sets engaging respective coded patterns and connected to the contact sets to control the clutch means for rotating the drums to positions corresponding to their respective code plates, a second group of drums bearing numeral indications, means mounting the second group of drums adjacent the first group of drums on an axis parallel with the axis of the first group for observation from a direction opposite that of the first group, and gear assemblies including the group of gears connecting succeeding drums in the first group to succeeding drums in the reverse order in the second group to drive the second group of drums for visual observation of the decimal denominations in their conventional left to right order when the first and second groups of drums are observed from opposite directions.

References Cited in the file of this patent
UNITED STATES PATENTS

| | | |
|---|---|---|
| 1,975,694 | Knotz | Oct. 2, 1934 |
| 2,603,702 | Kern | July 15, 1952 |
| 2,617,870 | Kern | Nov. 11, 1952 |
| 2,759,672 | Simonds et al. | Aug. 21, 1956 |
| 2,822,130 | Nolde | Feb. 4, 1958 |
| 2,840,807 | Todd | June 24, 1958 |
| 2,889,546 | Bell et al. | June 2, 1959 |
| 2,955,755 | Bradshaw | Oct. 11, 1960 |
| 2,961,155 | Olsen | Nov. 22, 1960 |